US005870175A

United States Patent [19]
Nakaya

[11] Patent Number: 5,870,175
[45] Date of Patent: Feb. 9, 1999

[54] INDEX PRINTER HAVING DENSITY CORRECTION USING A STANDARD IMAGE

[75] Inventor: Yoshihito Nakaya, Kanagawa, Japan

[73] Assignee: Fuji Photo Film Co., Ltd., Kanagawa, Japan

[21] Appl. No.: 724,901

[22] Filed: Oct. 3, 1996

[30] Foreign Application Priority Data

Oct. 6, 1995 [JP] Japan .................................. 7-260124

[51] Int. Cl.$^6$ ........................... G03B 27/52; G03B 27/72; G03B 27/80; G03B 27/54

[52] U.S. Cl. ................................. 355/40; 355/35; 355/38; 355/67; 355/68; 355/70; 355/71

[58] Field of Search .................................. 355/32, 35, 67, 355/68, 70, 38, 71

[56] References Cited

U.S. PATENT DOCUMENTS

5,223,892  6/1993  Ikenoue et al. ............................ 355/77
5,703,671  8/1996  Narita et al. ............................... 355/32

Primary Examiner—Richard Moses
Assistant Examiner—Shival Virmani
Attorney, Agent, or Firm—Sughrue, Mion, Zinn, Macpeak & Seas, PLLC

[57] ABSTRACT

An index printer in which density correction can be reliably effected and in which an appropriate image can be printed is obtained. When a standard image data such as a so-called Bull's eye is input from an image memory to a gray image processing portion of a sub-control portion, data which is greater than a predetermined threshold value Q is extracted from the standard image data and is averaged so as to set a standard gray image. The set standard gray image is displayed on a whole surface of a display surface of a liquid crystal panel via a liquid crystal panel driver, and is printed onto a photographic printing paper by a light source.

18 Claims, 6 Drawing Sheets

INDEX PRINTER HAVING DENSITY CORRECTION USING A STANDARD IMAGE

BACKGROUND OF THE INVENTION

1. Field of the Invention

The present invention relates to an index printer, and more particularly to an index printer which effects density correction using a standard image.

2. Description of the Related Art

Conventionally, an image printing apparatus, in which images recorded on a developed negative film are printed and developed onto a photographic printing paper so as to be able to obtain a photographic print, is well-known. In this type of image printing apparatus, conditions of exposure can be reset such that an appropriate photographic print is always obtained. In a case in which the conditions of exposure are set for such an image printing apparatus, a so-called Bull's eye, on which a gray image is recorded, is used. The Bull's eye is printed onto the photographic printing paper so as to obtain a test print. On the basis of the density of the test print, a color balance, a slope and the like ire adjusted and the conditions of exposure are corrected. The appropriate print, which corresponds to the image recorded on the photographic film, can be obtained by the reference amount of exposure determined by this correction.

On the other hand, in recent years, an index print in which frames are printed in a matrix has been proposed such that pictures photographed on a piece of developed film can be easily searched. A well-known example of an index printer which can produce such an index print is an index printer, in which a liquid crystal panel is used as image displaying means, a plurality of image frames recorded on the photographic film are displayed once on a display surface of the liquid crystal panel, and the images are simultaneously printed onto the photographic printing paper as the images smaller than those of the ordinary print.

In order to obtain appropriate images at the above-described index printer, it is necessary to set exposure conditions of the index printer similarly to an ordinary image printing apparatus. In this case, the image data obtained at the time of producing the main print (or ordinary print) can be used as it is at the index printer. Because a light source used at the time of producing the main print is different from the one used at the time of producing the print of the liquid crystal image, it suffices if the difference in densities is adjusted. At this time, the Bull's eye is used for correcting the difference in densities similarly to the correction of conditions of exposure for main print.

However, if the previously-described Bull's eye for adjusting the amount of exposure is used as it is at the index printer, there is a case in which the frame portion which displays the Bull's eye deviates from the center of the display screen such that the gray image does not exist at the center of the photographic printing paper. Unless the gray image is displayed at the center of the photographic printing paper, the density cannot be measured by a densitometer which is disposed so as to measure the density of the center of the photographic printing paper. Moreover, the position of the image frame on the index print can be altered such that the image frame which corresponds to the gray image is disposed at the center of the photographic printing paper. However, since the image is printed with the size of the image frame being reduced as compared to the size of an ordinary print, the size of the frame is small, and therefore, mistakes in reading the image can occur.

SUMMARY OF THE INVENTION

With the aforementioned in view, an object of the present invention is to provide an index printer in which density correction can be reliably effected and in which an appropriate image can be printed.

In accordance with the first aspect of the present invention, an index printer in which a plurality of images recorded on a photographic film is arranged in a matrix so as to form an index image, and the index image is displayed on a liquid crystal panel so as to be printed onto a photosensitive material several frames at a time along a conveying direction of the photosensitive material, and in which density correction can be made using a standard image for setting predetermined conditions, comprises: a reference gray image processing portion which displays image data of the standard image on the liquid crystal panel, and prints gray components of the image data onto a central portion of the photosensitive material at a predetermined magnification.

In accordance with the first aspect of the present invention, in the index printer, the gray components of the standard image for setting the conditions are printed onto the central portion of the photosensitive material at the predetermined magnification. Therefore, although the index printer is normally disposed every image frame, in a case in which the conditions are set using the standard image, the gray components are printed onto the central portion of the photosensitive material, regardless of the positions at which the frames are disposed. As a result, the printing density can be accurately measured by corresponding to a density measuring device which measures the density of the central portion of the photosensitive material.

Accordingly, the density correction on the basis of the accurate measurement of the density can be effected, and the appropriate images can be printed.

The index printer in accordance with the second aspect of the present invention is according to the first aspect of the present invention, wherein the reference gray image processing portion enlarges the gray components of the image data of the standard image larger than the gray components of ordinary index image frames, and prints the enlarged gray components onto the central portion of the photosensitive material.

In accordance with the second aspect of the present invention, the gray components of the image data of the standard image are enlarged and printed onto the central portion of the photosensitive material. Therefore, even if the position at which the density is measured by the density measuring device is slightly deviated, the measurement can be reliably effected, whereby the images can be printed with effecting the appropriate density correction.

The index printer in accordance with the third aspect of the present invention is according to the first aspect of the present invention, wherein the reference gray image processing portion extracts the gray components from the image data of the standard image, and displays the extracted gray components on a whole display surface of the liquid crystal panel so as to print the gray components onto the photosensitive material.

In accordance with the third aspect of the present invention, the gray components are extracted from the standard image, are displayed on the whole display surface of the liquid crystal panel, and are uniformly printed onto the photosensitive material in the transverse direction thereof. Therefore, even if the density measuring device corresponds to any position on the photosensitive material, the density can be reliably measured.

The index printer in accordance with the fourth aspect of the present invention is according to the first through third aspects of the present invention, wherein the reference gray image processing portion obtains an average density of the gray components from the image data of the standard image, and displays the obtained gray components.

In accordance with the fourth aspect of the present invention, because the gray components which are to be the subjects of the density measurement are obtained by averaging, even and uniform gray components of the standard image are printed. Therefore, the density can be measured by the density measuring device by using the gray components having a constant density, and the appropriate density correction can be effected.

The index printer in accordance with the fifth aspect of the present invention is according to the first through third aspects of the present invention, wherein the reference gray image processing portion extracts and averages gray components which are greater than a predetermined threshold value from the image data of the standard image, and displays the obtained gray components.

In accordance with the fifth aspect of the present invention, since the gray components are extracted from the image data which is greater than the predetermined threshold value and are averaged, the gray components which are more suitable as a standard image can be printed. Therefore, more suitable density correction can be effected by measuring the density of the obtained image.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

An embodiment of the present invention will be described hereinafter with reference to the drawings.

Figure 1:
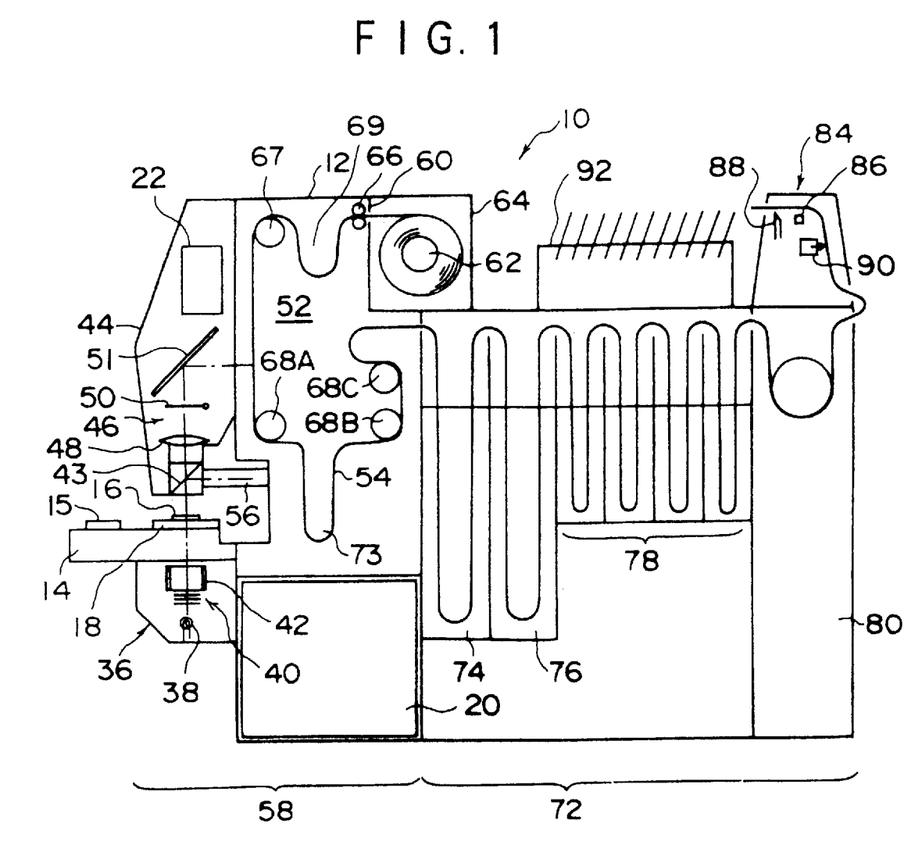
FIG. 1 is a schematic structural view of a printer processor according to a present embodiment.

As illustrated in FIG. 1, an outer portion of a printer processor 10 is covered by a casing 12. The printer processor 10 includes a printer section 58, which effects exposure of a main print and a sub-print onto a photographic printing paper, and a processor section 72, which effects developing, fixing, washing and drying processes to the exposed photographic printing paper.

A worktable 14 which projects from the casing 12 (towards the left-hand side in FIG. 1) is provided at the printer section 58. A negative carrier 18, in which a negative film 16 is loaded, and a keyboard 15, to which an operator inputs command, data or the like, are disposed on the upper surface of the worktable 14.

A light source portion 36 for main exposure is provided below the worktable 14. A light source 38 is provided at the light source portion 36 for main exposure. A color-correction filter (hereinafter, "CC filter") 40 and a diffusion tube 42 are provided at the light source portion 36 for main exposure in that order such that the light irradiated from the light source 38 is illuminated onto the negative film 16, which has been loaded into the negative carrier 18 disposed on the worktable 14. The CC filter 40 includes filters of C (cyan), M (magenta) and Y (yellow). The respective filters are operated under the control of a CC filter control portion 39 (FIG. 2) and can be inserted onto and withdrawn from the optical axis of the light irradiated from the light source 38.

An arm 44 is provided above the negative carrier 18 (the upper side in FIG. 1). An optical system 46 for main exposure and a sub-print portion 22, which effects the exposure of the sub-print such as an index print, are provided within the arm 44.

From the light-irradiating side of the negative film 16, a half mirror 43, an exposure lens 48 for changing magnification of exposure, a black shutter 50 and a mirror 51 are disposed at the optical system 46 for main exposure in that order. The negative image is imaged on a photographic printing paper 54 which is set to a exposure chamber 52.

A loading portion 60 is provided at a corner portion between an upper right-hand side surface and an upper surface of the casing 12. A paper magazine 64, which accommodates the photographic printing paper 54 wound in layers around a reel 62, is loaded into the loading portion 60. A roller pair 66 is disposed in a vicinity of the loading portion 60. The roller pair 66 holds the photographic printing paper 54 so as to convey the photographic printing paper 54 to the exposure chamber 52 in a horizontal state.

Rollers 67, 68A, 68B and 68C are further disposed at the exposure chamber 52. At the exposure chamber 52, the photographic printing paper 54, onto which the images of the negative film 16 are printed, is conveyed by the rollers 66, 67, 68A, 68B and 68C to the processor section 72, which will be described later.

Further, a second stock portion 73, which guides and stocks the printed photographic printing paper 54 in a substantially U-shape, is provided between the rollers 68A and 68B. By stocking the photographic printing paper 54 at the second stock portion 73, difference in processing time between the printer section 58 and the processor section 72 is absorbed.

At the processor section 72, a color developing tank 74 which stores a color developing solution, a bleaching/fixing tank 76 which stores a bleaching/fixing solution, and a plurality of rinsing tanks 78 which store rinsing solutions are provided. The photographic printing paper 54 is successively passed through the tanks such that developing, fixing and washing processes are effected on the photographic printing paper 54. The washed photographic printing paper 54 is conveyed to a drying portion 80, which is in a vicinity of the rinsing tanks 78, so as to be subject to a drying process.

The photographic printing paper 54 is nipped by an unillustrated roller pair. After completion of the drying process, the photographic printing paper 54 is discharged from the drying portion 80 at a certain velocity. A cutter portion 84 is provided at the downstream side of the drying portion 80. The cutter portion 84 is provided with a cut mark sensor 86 which detects a cut mark made on the photographic printing paper 54, a paper density measuring portion 90 which detects density of the photographic printing paper 54 and a cutter 88 which cuts the photographic printing paper 54. The cut mark sensor 86, the paper density measuring portion 90 and the cutter 88 are respectively connected to a main control portion 20. At the cutter portion 84, the photographic printing paper 54 is cut every image frames by the cutter 88 and is discharged to the sorter portion 92. The image frames are sorted and subject to a predetermined checking operation at the sorter portion 92. After a poor print such as a so-called blurred photograph is removed by this checking operation, a normal photographic print is returned to a customer together with a negative film.

The paper density measuring portion 90 is provided so as to oppose a substantially central portion of the photographic printing paper 54, and measures the density of the images on the opposing developed photographic printing paper 54. The paper density measuring portion 90 is connected to the main control portion 20, which will be described later, and transmits the results of measurement to the main control portion 20.

Figure 2:
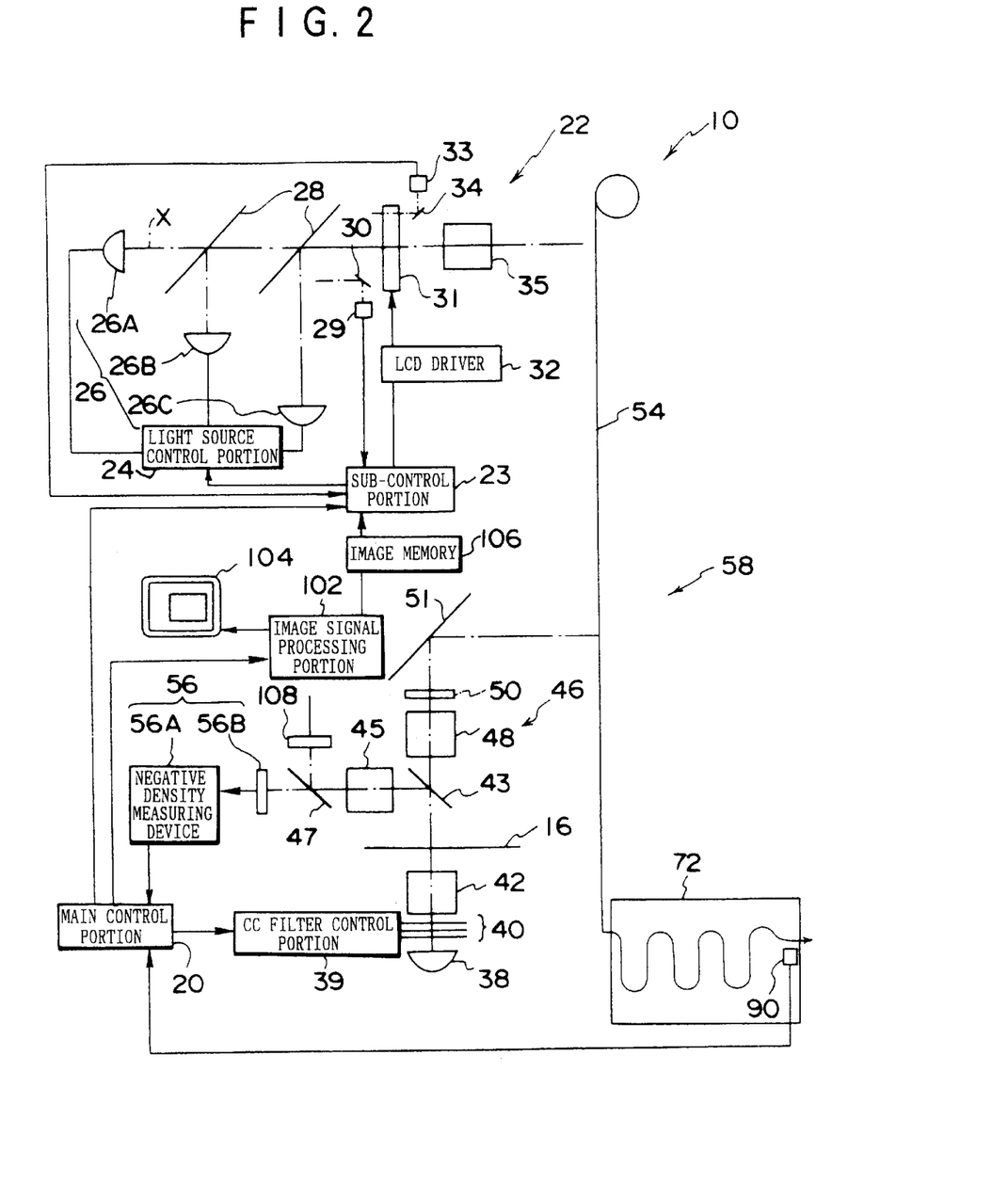
FIG. 2 is a block diagram showing a printer section of the printer processor.

As illustrated in FIG. 2, at the downstream side of the optical path reflected by the half mirror 43, a photometrically measuring lens 45, which changes a magnification of the image for photometrically measuring, and a half mirror 47 are disposed in that order. In the present embodiment, the magnification of the photometrically measuring lens 45 is set to a predetermined magnification.

A scanner 108, which is formed by an image sensor or the like, is provided in the direction in which the light is reflected by the half mirror 47. An image signal processing portion 102, in which a predetermined image processing is effected on the image data of each frame of the negative film 16 read by the scanner 108, is connected to the scanner 108.

A simulator 104 is connected to the image signal processing portion 102. Simulation images of the print which is produced on the basis of the set conditions for each of the images of the respective frames of the negative film 16 are displayed at the simulator 104. Further, an image memory 106 for storing image data is connected to the image signal processing portion 102. In the image memory 106, the image signal processing portion 102 stores image data of each frame of the negative film 16 read by the scanner 108.

On the other hand, at the downstream side of the optical path transmitted through the half mirror 47, a negative density measuring portion 56 which measures image density of each frame of the negative frame 16 is provided. The negative density measuring portion 56 is formed by a scanner 56B, which is formed by an image sensor or the like, and a negative density measuring device 56A, which measures image density of each frame of the negative frame 16 read by the scanner 56B. The negative density measuring device 56A is connected to the main control portion 20.

As a light source 26 for exposing an index image which is operated and controlled by a light source control portion 24, the sub-print portion 22 is provided with a light emitting diode which irradiates blue light (hereinafter, "B-LED") 26A, a light emitting diode which irradiates red light (hereinafter, "R-LED") 26B and a light emitting diode which irradiates green light (hereinafter, "G-LED") 26C. The respective diodes are disposed such that the light irradiated from the R-LED 26B and the light irradiated from the G-LED 26C are coincided by a dichroic mirror 28 with an exposure optical axis X of the light irradiated from the B-LED 26A.

A liquid crystal panel 31 is provided at the downstream side of the exposure optical axis X by the light source 26. In a vicinity of the liquid crystal panel 31 and at a location to which images are not affected, a mirror 30 and a sensor 29 for measuring an amount of light irradiated from the light source are provided in that order. A plurality of liquid crystal elements are arranged regularly at the liquid crystal panel 31, and the Light can be transmitted in 256 stages (corresponding to gradation). A size of an edge of the display surface of the liquid crystal panel 31 is set such that the width of the image to be printed is substantially the same as that of the photographic printing paper 54.

The liquid crystal panel 31 is connected to a sub-control portion 23 via a liquid crystal panel driver 32. The sub-control portion 23 is formed by a microcomputer which includes a CPU, a RAM, a ROM, an input/output controller and the like and is connected to the image memory 106.

A sub-control portion 23 reads the image data of each frame of the negative film 16 stored in the image memory 106 so as to form an index image data in which images of the frames are disposed in accordance with a predetermined rule. The image which corresponds to the image data of a predetermined number of frames, e.g., five frames (one row), among the images of the frames in the formed index image data is output to the liquid crystal panel driver 32 by the sub-control portion 23 as a signal which corresponds to the state in which the light is transmitted through the respective liquid crystal elements. Accordingly, the liquid crystal panel driver 32 controls the state in which the light is transmitted through the respective liquid crystal elements in accordance with this signal, and displays on the liquid crystal panel 31 the image which corresponds to the formed index image data. Moreover, among the above-described one row of image data, the image which corresponds to the image data having a color component of each one of R (red), G (green) and B(blue) can be displayed on the liquid crystal panel 31.

A mirror 34 and a sensor 33 for measuring an amount of light transmitted through the liquid crystal panel 31 are disposed at the irradiating side of the liquid crystal panel 31 and at a location to which images are not affected.

An exposure lens 35 whose magnification can be changed is disposed at the irradiating side of the liquid crystal panel 31. The image which has been transmitted through the liquid crystal panel 31 is imaged on the photographic printing paper 54 at a predetermined magnification by the exposure lens 35.

Further, the aforementioned light source control portion 24, the sensor 29 and the sensor 33 are connected to the sub-control portion 23. The sub-control portion 23 calculates an appropriate amount of correction of light on the basis of the amount of Light of each color R, G and B measured by the sensor 29, and causes the light source control portion 24 to correct the amount of light of each component of the light source 26. Similarly, on the basis of the amount of transmission of light measured by the sensor 33, the sub-control portion 23 controls the liquid crystal panel driver 32 so as to obtain an appropriate amount of transmission of light, and adjusts the density of the image displayed on the liquid crystal panel 31.

Similarly to the sub-control portion 23, the main control portion 20 for controlling and monitoring the printer processor 10 as a whole is provided beneath the exposure chamber 52 (see FIG. 1). The main control portion 20 includes a CPU, an RAM, an ROM, an input/output controller and the like, which are unillustrated. The main control portion 20 is connected to the aforementioned CC filter control portion 39, the negative density measuring device 56A, the image signal processing portion 102 and the sub-control portion 23, and monitors and controls the operations thereof.

Further, on the basis of the density measurement value of the printed image inputted from the paper density measuring portion 90, the main control portion 20 controls the CC filter control portion 39, the image signal processing portion 102 and the sub-control portion 23, and corrects the conditions of exposure so as to obtain an appropriate image.

Figure 3:
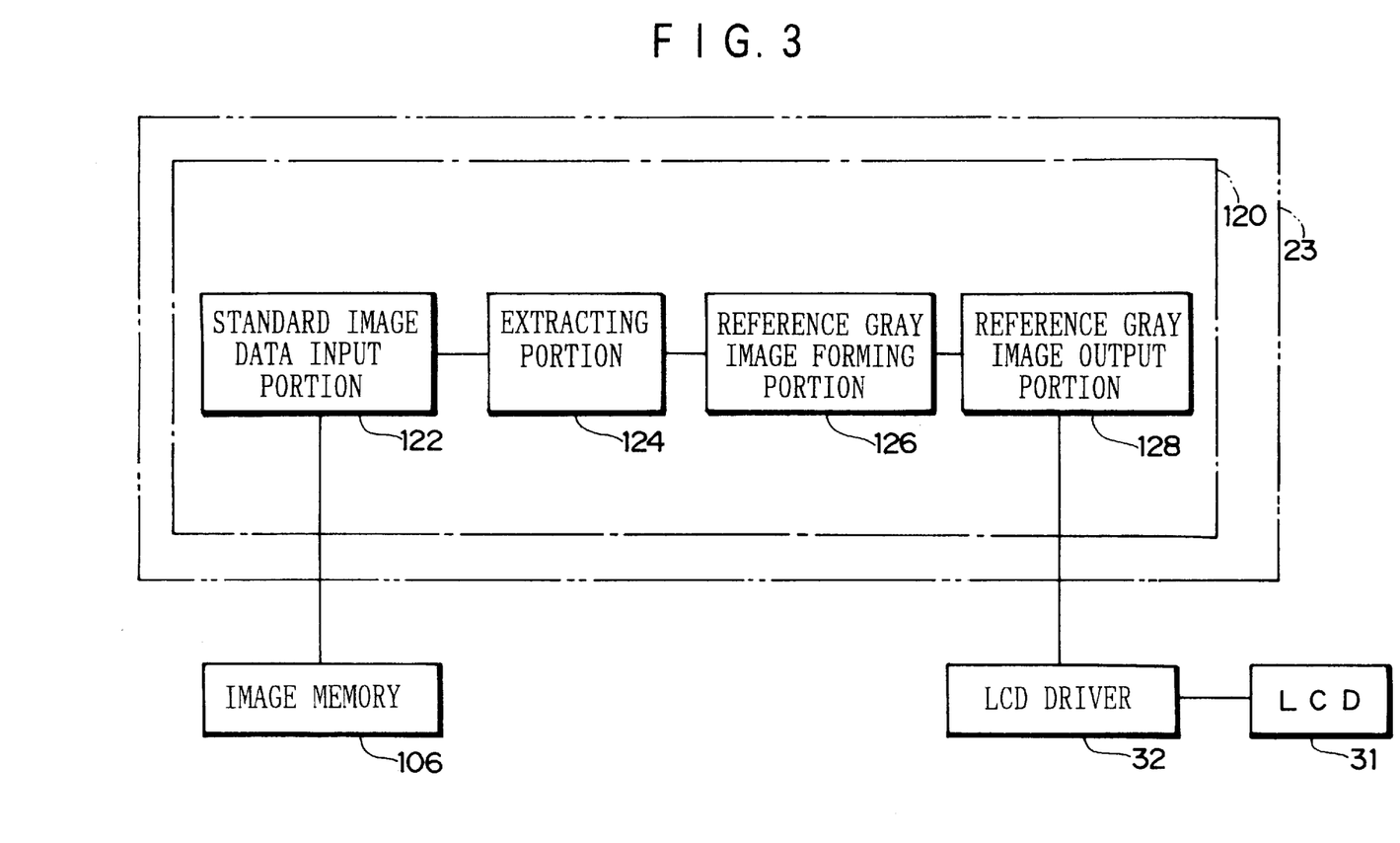
FIG. 3 is a structural view showing a system structure of a gray image processing portion of the printer processor.

As shown in FIG. 3, the sub control portion 23 includes a gray image processing portion 120. The gray image processing portion 120 will be described hereinafter.

The gray image processing portion 120 includes a standard image data input portion 122 which is connected to the image memory 106. When the conditions of exposure are set, an image data of the standard image which is stored in the image memory 106 is inputted to the standard image data input portion 122. Similarly to the image data of the negative film 16, the image data of the standard image is stored in advance in the image memory 106 via the image signal processing portion 102.

An extracting portion 124 is connected to the standard image data input portion 122. Among the data of the standard image transmitted from the standard image data input portion 122, the extracting portion 124 extracts data which is greater than a threshold value Q set in advance. The threshold value Q which has been set in advance is set such that, in a case in which a standard image is a so-called Bull's eye, reference gray components can be reliably extracted from the negative. As a result, even if components other than the gray components are included in the standard image, the components other than the gray components are eliminated and the reference gray components can be reliably extracted therefrom.

A reference gray image forming portion 126 is connected to the extracting portion 124, and forms a reference gray image on the basis of a plurality of gray components which have been extracted by the extracting portion 124. Here, the reference gray image is formed by averaging a part or all of the gray components which have been extracted on the basis of the threshold value Q. In a case in which a part of the gray components are used and in a case in which the standard image is a Bull's eye, data which is near a central portion of the image is extracted. Accordingly, the reference gray image is formed as a uniform image.

A reference gray image output portion 128 is connected to the reference gray image forming portion 126. The reference gray image output portion 128 outputs to the liquid crystal panel driver 32, which is connected thereto, the reference gray image obtained by the reference gray image forming portion 126 so as to display the image on the liquid crystal panel 31. Moreover, the reference gray image output portion 128 sets and outputs a display area of the reference gray image on the display surface of the liquid crystal panel 31. The display area of the reference gray image can be set as a region, on the display surface of the liquid crystal panel 31, in which the reference gray image can be printed onto the region of the photographic printing paper 54 which can be measured by the paper density measuring portion 90. In the present embodiment, the display area of the reference gray image is set as a whole region of the display surface on the liquid crystal panel 31. As a result, wherever the paper density measuring portion 90 is disposed, the printing density of the reference gray image can be reliably measured.

The gray image processing portion 120 is connected to the liquid crystal panel driver 32 via the reference gray image output portion 128. As a result, a state, in which the light is transmitted through the liquid crystal elements of the liquid crystal panel 31, is controlled on the basis of the instructions of the reference gray image output portion 128, and the reference gray image is displayed on the liquid crystal panel 31.

Accordingly, when a standard image data such as a so-called Bull's eye is input from the image memory 106 to the gray image processing portion 120 of the sub-control portion 23, data which is greater than the predetermined threshold value Q is extracted from the standard image data and is averaged so as to obtain a reference gray image. The obtained standard gray image is displayed on the whole surface of the display surface of the liquid crystal panel 31 via the liquid crystal panel driver 32 and is printed onto the photographic printing paper 54 by the light source 26.

Next, the operation of the present embodiment will be explained.

In the printer section 58 of the printer processor 10, the negative film 16, on which the images to be printed are recorded, is loaded in the negative carrier 18, and the light generated by the light source 38 is transmitted through the negative film 16. The density of the image of the negative film 16, which is imaged by the light transmitted through the negative film 16, is measured by the negative density measuring portion 56. On the basis of the measured density of the images of the negative film 16, appropriate conditions of exposure (e.g., an amount of insertion of each filter of the filter portion 40) are set by the main control portion 20. On the basis of the set conditions of exposure, the images of the negative film 16 are printed onto the predetermined printing region of the photographic printing paper 54. The printed photographic printing paper 54 is conveyed to the processor portion 72 so as to be subject to developing, fixing and washing processes. The washed photographic printing paper 54 is conveyed to the drying portion 80 so as to be dried with hot air. The dried photographic printing paper 54 is conveyed to the cutter portion 84, and is cut every image frames by the cutter 88 so as to become a photographic print. The photographic print is discharged to and sorted at the sorter portion 92.

On the other hand, in the exposure process of the image in the sub-print portion 22, the images of the negative film 16, through which the light generated by the light source 38 has been transmitted, are read by the scanner 108, and the read image data is stored in the image memory 106 via the image signal processing portion 102. The image data is read from the image memory 106 by the sub-control portion 23. The images which correspond to blue components of the image data (hereinafter, "blue images) are displayed on the liquid crystal panel 31 such that the blue images are imaged on the photographic printing paper 54. The B-LED 26A is lit for a period of time in accordance with the previously-set conditions of exposure. Accordingly, the blue images of the image data are exposed to the photographic printing paper 54. Hereinafter, in the same way as the blue images, red components (red images) of the image data and green components (green images) thereof are displayed on the liquid crystal panel 31. The red component image, the green component image and the blue component image are exposed onto the photographic printing paper 54 one over another by the light source 26 corresponding to the respective component image such that the image to be printed is exposed to the photographic printing paper 54.

Figure 5:
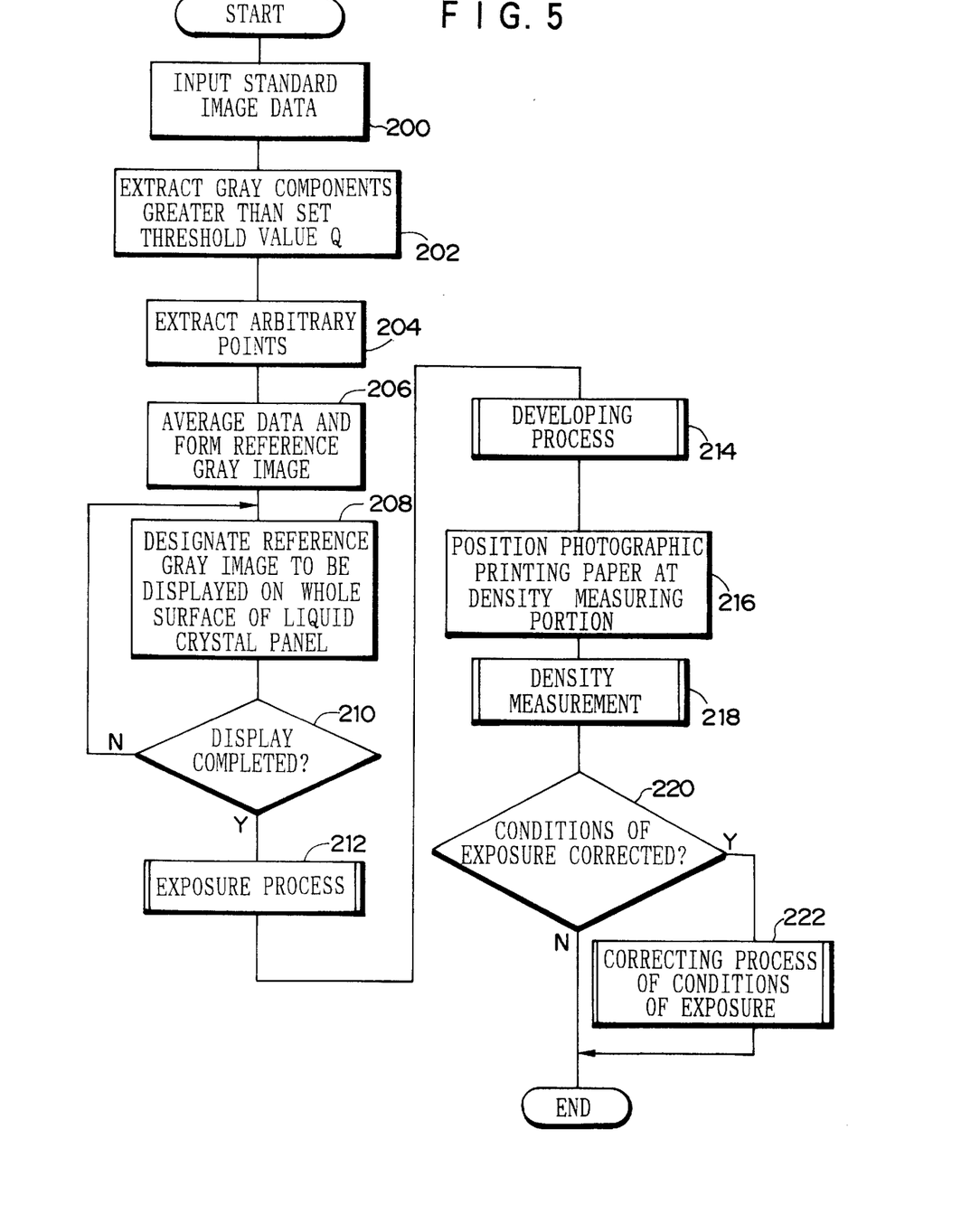
FIG. 5 is a flow chart which shows a process of setting and correcting exposure conditions.

Next, the operation of setting and correcting exposure conditions using a gray image will be explained with reference to FIG. 5.

Figure 4A:
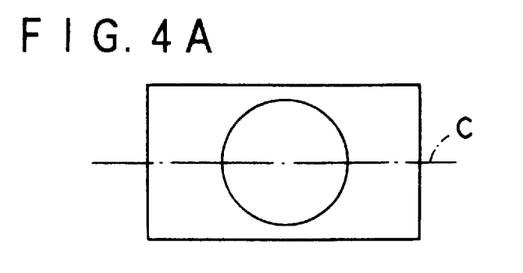
FIG. 4A is a plan view of a Bull's eye.
Figure 4B:
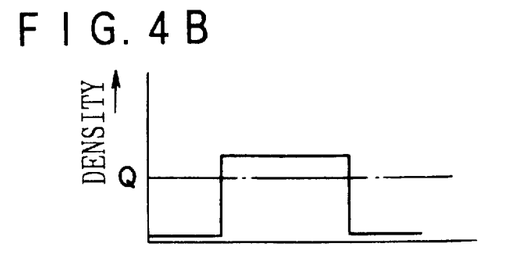
FIG. 4B is a graph showing a transmission density of the Bull's eye.

When it is designated that the exposure conditions should be set or corrected, the standard image data is input from the image memory 106 to the standard image data input portion 122 of the sub-control portion 23 in step 200. Here, the standard image is a so-called Bull's eye image as illustrated in FIG. 4A, and a gray image, which is obtained as a photographed subject, is printed onto the central portion of the negative. Accordingly, the transmitted image of the Bull's eye is, for example, an image in which the transmission densities on a dotted line C in FIG. 4A are as shown in FIG. 4B. The digital image data is processed by the image signal processing portion 102 and is stored in the image memory 106.

When the standard image data is input, the gray components greater than the set threshold value Q are extracted in step 202. As illustrated in FIG. 4B, since the transmission density of the central portion (i.e., a gray portion) of the Bull's eye is higher than the other portions thereof, the image data whose transmission density is higher than the predetermined threshold value Q is extracted as a gray component, and the image data whose transmission density is lower than the predetermined threshold value Q is eliminated. The threshold value Q can be set by extracting in advance several points near the central portion (the gray portion) of the Bull's eye.

When the gray components larger than the threshold value Q are extracted, a plurality of arbitrary data are further extracted from the extracted gray components in step 204. As a result, the number of data to be used for processing is reduced to some extent, thereby allowing a quick processing.

When the arbitrary data is extracted, the obtained group of data are averaged so as to form a reference gray image in step 206. Accordingly, a uniform reference gray image which is used for setting and correcting the conditions of exposure is obtained.

Figure 4C:
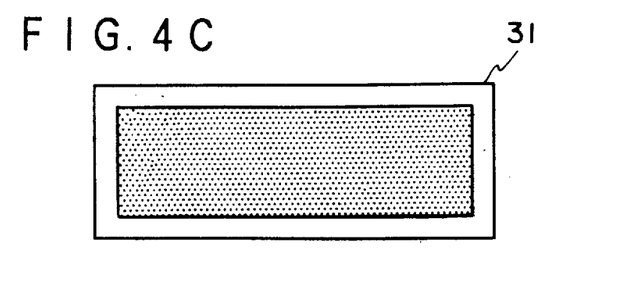
FIG. 4C shows a reference gray image displayed on a liquid crystal panel.

When the reference gray image is formed, in step 208, an instruction is made so as to display the reference gray image on the whole surface of the display surface of the liquid crystal panel 31. As illustrated in FIG. 4C, the whole liquid crystal elements which form the liquid crystal panel 31 are controlled and set to a transmitted state which corresponds to the transmittance of the reference gray image such that the uniform reference gray image is displayed on the image display surface.

When it is instructed that the reference gray image should be displayed, a determination is made as to whether the display has been completed in step 210. Until completion of the display, the answer to the determination in step 210 is "No".

When the display of the reference gray image on the whole surface of the display surface of the liquid crystal panel has been completed, the answer to the determination in step 210 is "Yes". The process then moves to stop 212 where an exposure process is effected on the reference gray image. The exposure process is effected such that the light generated by the light source 26 is transmitted through the displayed reference gray image by an amount of exposure to be corrected and the reference gray image is printed onto the photographic printing paper 54.

When the exposure process has been completed, in step 214, a developing process is effected on the obtained reference gray image by the processor section 72. The developing process is effected by conveying the photographic printing paper 54 to the various processing tanks in the processor section 72.

When the photographic printing paper 54 has been conveyed and passed through the respective processing tanks and the developing process has been completed, in step 216, the photographic printing paper 54 is further conveyed and is positioned under the measuring area of the paper density measuring device 90. Because the gray image is printed onto the whole surface of the photographic printing paper 54, the positioning of the photographic printing paper 54 can be easily effected without requiring a precise positioning.

When the photographic printing paper 54 is positioned at the density measuring area, the density of the printed reference gray image is measured by the paper density measuring device 90 in step 218.

When the density is measured, in step 220, a determination is made as to whether the conditions of exposure are corrected on the basis of the results of measurement. If the answer to the determination in step 220 is "Yes", the process moves to step 222 and the conditions of exposure are corrected. Based on the results of density measurement, the main control portion 20 and the sub-control portion 23 correct the conditions of exposure by adjusting the transmitted states of the respective pixels of the liquid crystal panel 31, the exposure time of the light source 26, the respective color components which form the light source 26, and the like. If the answer to the determination in step 220 is "No" since the conditions of exposure are not corrected, or if the correction of the conditions of exposure has been completed, a series of processes are completed.

Consequently, because the reference gray image is easily formed using the gray image data and is displayed on the whole surface of the display surface of the liquid crystal panel 31, the reference gray image can be printed over a substantially whole surface of the photographic printing paper 54 in the transverse direction thereof. As a result, based on the reference gray image, the density can be reliably measured by the paper density measuring portion 90 so as to effect appropriate correction for conditions of exposure, and the image based on the appropriate conditions of exposure can be easily and reliably obtained.

Moreover, because the reference gray image can be printed onto the photographic printing paper 54 by a predetermined length in the conveying direction thereof and over the whole surface of the photographic printing paper 54 in the transverse direction thereof, even if the photographic printing paper 54 is meanderingly conveyed, and even if the conveying direction of the photographic printing paper 54 is deviated, the density can be reliably measured by the paper density measuring device 90.

In the present embodiment, the reference gray image is displayed on the whole area of the display surface of the liquid crystal panel 31. However, the present invention is not limited to the same. For example, in a case in which the paper density measuring portion 90 is disposed so as to be able to measure the density of the central portion of the photographic printing paper 54, the reference gray image can be displayed at the central portion of the liquid crystal panel 31. Accordingly, the paper density measuring portion 90 can effect the measurement of the reference gray image without using all of the liquid crystal elements of the liquid crystal panel 31 so that the conditions of exposure can be reliably set.

Further, in the present embodiment, the reference gray image is formed by averaging a plurality of arbitrary data extracted from the gray components which are greater than the threshold value Q. However, the present invention is not limited to the same. The reference gray image may be formed by averaging all of the gray components which are greater than the threshold value Q, or by using the gray components of the Bull's eye as they are. How to form the reference gray image can be selected on the basis of the uniformity of the gray components and the precision of effecting the density correction.

In the present embodiment, the reference gray image is displayed on the whole surface of the display surface of the liquid crystal panel 31 and is printed onto the whole area of the photographic printing paper 54 in the transverse direction thereof. However, the present invention is not limited to the same.

Figure 6A:
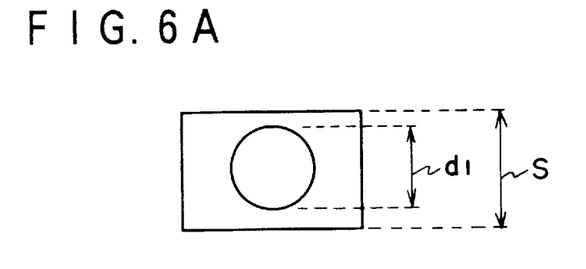
FIG. 6A is a plan view of a Bull's eye.
Figure 6B:
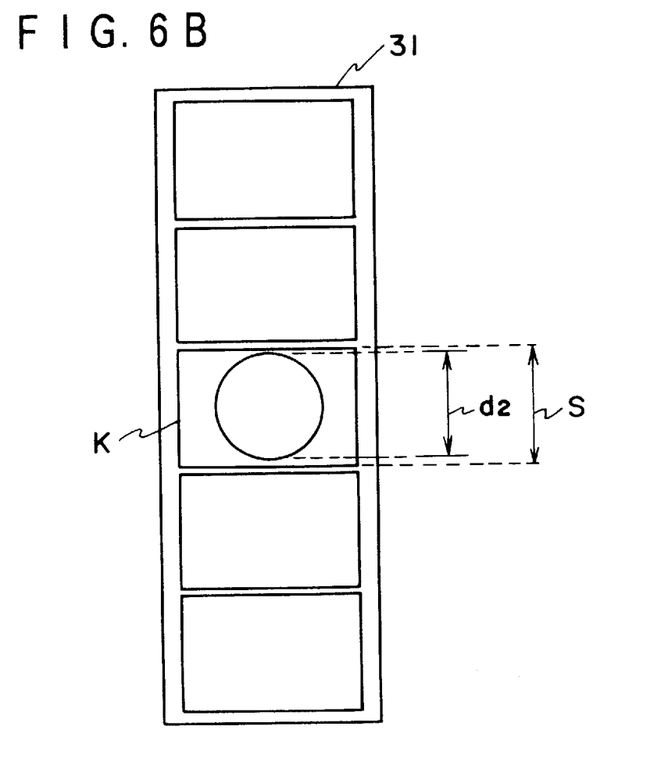
FIG. 6B is a plan view of a display surface of a liquid crystal panel which displays an enlarged gray image of the Bull's eye.

FIG. 6B is another example showing a case in which a Bull's eye illustrated in FIG. 6A is displayed on the liquid crystal panel 31 as an index image. Here, the image frame of the Bull's eye is disposed at the third image frame K which corresponds to the central portion of the five rows, and the image frame in which rate occupied by the portion corresponding to the gray image of the Bull's eye is enlarged is displayed ($d_1/S < d_2/S$). As a result, the gray image can be measured by the paper density measuring device 90 more reliably than the case in which the gray image is simply disposed at the center of the liquid crystal panel 31.

Moreover, the gray image of the Bull's eye may be further enlarged so as to make the whole surface of the image frame K a gray image. Accordingly, the density of the gray image can be more reliably measured by the paper density measuring device 90 which is disposed so as to oppose the central portion of the photographic printing paper 54.

In accordance with the present invention, it is possible to provide the index printer in which the density correction is reliably effected and in which the appropriate image is printed.

While the embodiments of the present invention, as herein disclosed, constitute a preferred form, it is to be understood that other forms might be adopted.

What is claimed is:

1. An index printer in which a plurality of images recorded on a photographic film is arranged in a matrix so as to form an index image, and the index image is displayed on a liquid crystal panel so as to be printed onto a photosensitive material several frames at a time along a conveying direction of the photosensitive material, and in which density correction can be made using a standard image for setting predetermined conditions, comprising:

a reference gray image processing portion which displays image data of said standard image on said liquid crystal panel, and prints gray components of the image data onto a central portion of said photosensitive material at a predetermined magnification.

2. An index printer according to claim 1, wherein said reference gray image processing portion enlarges the gray components of the image data of said standard image larger than the gray components of ordinary index image frames, and prints the enlarged gray components onto the central portion of said photosensitive materiaL.

3. An index printer according to claim 1, wherein said reference gray image processing portion extracts the gray components from the image data of said standard image, and displays the extracted gray components on a whole display surface of said liquid crystal panel so as to print the gray components onto said photosensitive material.

4. An index printer according to claim 1, wherein said reference gray image processing portion obtains an average density of the gray components from the image data of said standard image, and displays the obtained gray components.

5. An index printer according to claim 2, wherein said reference gray image processing portion obtains an average density of the gray components from the image data of said standard image, and displays the obtained gray components.

6. An index printer according to claim 3, wherein said reference gray image processing portion obtains an average density of the gray components from the image data of said standard image, and displays the obtained gray components.

7. An index printer according to claim 1, wherein said reference gray image processing portion extracts and averages gray components which are greater than a predetermined threshold vaLue from the image data of said standard image, and displays the obtained gray components.

8. An index printer according to claim 2, wherein said reference gray image processing portion extracts and averages gray components which are greater than a predetermined threshold value from the image data of said standard image, and displays the obtained gray components.

9. An index printer according to claim 3, wherein said reference gray image processing portion extracts and averages gray components which are greater than a predetermined threshold value from the image data of said standard image, and displays the obtained gray components.

10. An index printer according to claim 1, wherein said standard image is a Bull's eye.

11. An index printer in which a plurality of images recorded on a photographic film is arranged in a matrix so as to form an index image, and the index image is displayed on a liquid crystal panel so as to be printed onto a photosensitive material several frames at a time along a conveying direction of the photosensitive material, and in which density correction can be made using a standard image for setting predetermined conditions, comprising:

a reference gray image processing portion which displays image data of said standard image on said liquid crystal panel, enlarges gray components of the image data larger than the gray components of ordinary index image frames, and prints the enlarged gray components onto a central portion of said photosensitive material.

12. An index printer according to claim 11, wherein said reference gray image processing portion obtains an average density of the gray components from the image data of said standard image, and displays the obtained gray components.

13. An index printer according to claim 11, wherein said reference gray image processing portion extracts and averages gray components which are greater than a predetermined threshold value from the image data of said standard image, and displays the obtained gray components.

14. An index printer according to claim 11, wherein said standard image is a Bull's eye.

15. An index printer in which a plurality of images recorded on a photographic film is arranged in a matrix so as to form an index image, and the index image is displayed on a liquid crystal panel so as to be printed onto a photosensitive material several frames at a time along a conveying direction of the photosensitive material, and in which density correction can be made using a standard image for setting predetermined conditions, comprising:

a reference gray image processing portion which extracts gray components from the image data of said standard image, and displays the extracted gray components on a whole display surface of said liquid crystal panel so as to print the gray components onto said photosensitive material.

16. An index printer according to claim 15, wherein said reference gray image processing portion obtains an average density of the gray components from the image data of said standard image, and displays the obtained gray components.

17. An index printer according to claim 15, wherein said reference gray image processing portion extracts and averages gray components which are greater than a predetermined threshold value from the image data of said standard image, and displays the obtained gray components.

18. An index printer according to claim 15, wherein said standard image is a Bull's eye.

* * * * *